US012783979B2

(12) United States Patent
Zhang et al.

(10) Patent No.: US 12,783,979 B2
(45) Date of Patent: Nov. 3, 2026

(54) USING A LANGUAGE MODEL TO CREATE ONLINE ORDERS FROM ONLINE CALENDAR DATA

(71) Applicant: Maplebear Inc., San Francisco, CA (US)

(72) Inventors: Xuan Zhang, Palo Alto, CA (US); Vinesh Reddy Gudla, South San Francisco, CA (US); Shishir Kumar Prasad, San Ramon, CA (US); Haixun Wang, Bellevue, WA (US); Brandon Leonardo, Redwood City, CA (US); Maxwell Mullen, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 19 days.

(21) Appl. No.: 18/986,234

(22) Filed: Dec. 18, 2024

(65) Prior Publication Data

US 2026/0170428 A1 Jun. 18, 2026

(51) Int. Cl.

*G06Q 10/00* (2026.01)
*G06F 40/00* (2020.01)
*G06F 40/40* (2020.01)
*G06Q 10/0631* (2023.01)

(Continued)

(52) U.S. Cl.

CPC ....... *G06Q 10/06314* (2013.01); *G06F 40/40* (2020.01); *G06Q 30/0633* (2013.01)

(58) Field of Classification Search

None

See application file for complete search history.

(56) References Cited

U.S. PATENT DOCUMENTS

| | | | | |
|---|---|---|---|---|
| 12,431,131 | B1 * | 9/2025 | Balasubramaniam | G10L 15/197 |
| 12,456,020 | B1 * | 10/2025 | Mishra | G06F 40/40 |
| 2021/0142103 | A1 * | 5/2021 | Xie | G06N 5/04 |

(Continued)

OTHER PUBLICATIONS

M. F. B. Othman, N. Bt Amir, M. Bin Mansu and A. M. Zeki, "Developing Mobile E-Groceries Model," 2015 4th International Conference on Advanced Computer Science Applications and Technologies (ACSAT), Kuala Lumpur, Malaysia, 2015, pp. 30-34 (Year: 2015).*

(Continued)

*Primary Examiner* — Matheus Ribeiro Stivaletti
(74) *Attorney, Agent, or Firm* — Fenwick & West LLP

(57) ABSTRACT

An online system uses a language model to create online orders from online calendar data shared by a user of the online system. The online system generates a first prompt for input into the language model including information about the online calendar and information about the user, and requests the language model to generate a first response that includes a list of consumption activities (e.g., meals). The online system generates a second prompt for input into the language model including the first response, and requests the language model to generate a second response that includes a list of components (e.g., ingredients). The online system generates, using the list of components, a list of items for user's conversion. Based on the list of items, the online system generates a user interface signal that causes a device associated with the user to display a user interface with the list of items.

20 Claims, 5 Drawing Sheets

(51) Int. Cl.
*G06Q 30/00* (2023.01)
*G06Q 30/0601* (2023.01)

(56) References Cited

U.S. PATENT DOCUMENTS

| | | | | |
|---|---|---|---|---|
| 2023/0386460 | A1* | 11/2023 | Fish | G06F 3/167 |
| 2024/0187500 | A1* | 6/2024 | Patra | H04L 67/535 |

OTHER PUBLICATIONS

A. Magar, S. Anand, T. Mahajan, S. Gujar and K. Wavale, "ShopSavvy—Empowering Local Commerce Through Online Price Comparison with AI Integration for Customers," 2024 International Conference on Progressive Innovations in Intelligent Systems and Data Science, Pattaya, Thailand, 2024, pp. 185-190 (Year: 2024).*

* cited by examiner

USING A LANGUAGE MODEL TO CREATE ONLINE ORDERS FROM ONLINE CALENDAR DATA

BACKGROUND

An online system is used for placing online orders so that users of the online system can perform online purchases of various items (e.g., groceries) offered by sources (e.g., retailers). Building a shopping cart for an online grocery shopping can be a lengthy process, particularly with a wide range of products to choose from. Additionally, planning and calculating the required groceries for a week can be challenging, especially for larger families with varying schedules and dietary needs. Even with careful planning, people tend to forget items, which leads to additional visits to the local grocery store (e.g., due to forgetting snacks for a weekday practice or an evening game), unplanned trips to retailer stores (e.g., due to forgetting a birthday gift for a child's friend, thus necessitating a last-minute shopping trip), increased expenses such as gas and mileage for in-person shopping, service fees and tips for online orders, etc.

It is therefore desirable for the online system to help families plan meals, based on their busy calendars. However, there is a technical problem of how to automatically and at a large scale as required by the online system enable their users to create online orders from their online calendars.

SUMMARY

Embodiments of the present disclosure are directed to using a language model to create online orders from online calendar data (i.e., calendar entries) shared by a user of an online system.

In accordance with one or more aspects of the disclosure, the online system receives, via a network and from a device associated with a user of the online system, an online calendar related to the user. The online system receives, from the device associated with the user and via the network, a request to generate a list of items for conversion based on the online calendar. Responsive to receiving the request, the online system generates a first prompt for input into a language model, the first prompt including information about the online calendar, information about the user, and a request for generating a first response that includes a list of consumption activities over a time period. The online system requests the language model to generate, based on the first prompt input into the language model, the first response that includes the list of consumption activities. The online system generates a second prompt for input into the language model, the second prompt including the first response, information about a location of the user, a time required to prepare one or more consumption activities from the list of consumption activities, and a request for generating a second response that includes a list of components related to the list of consumption activities. The online system requests the language model to generate, based on the second prompt input into the language model, the second response that includes the list of components. The online system generates, using the list of components, the list of items for conversion by the user. The online system generates, using the list of items, a first user interface signal. The online system sends, via the network, the first user interface signal to the device associated with the user, wherein the sending the first user interface signal causes the device associated with the user to display a user interface with the list of items for conversion by the user.

DETAILED DESCRIPTION

Figure 1A:
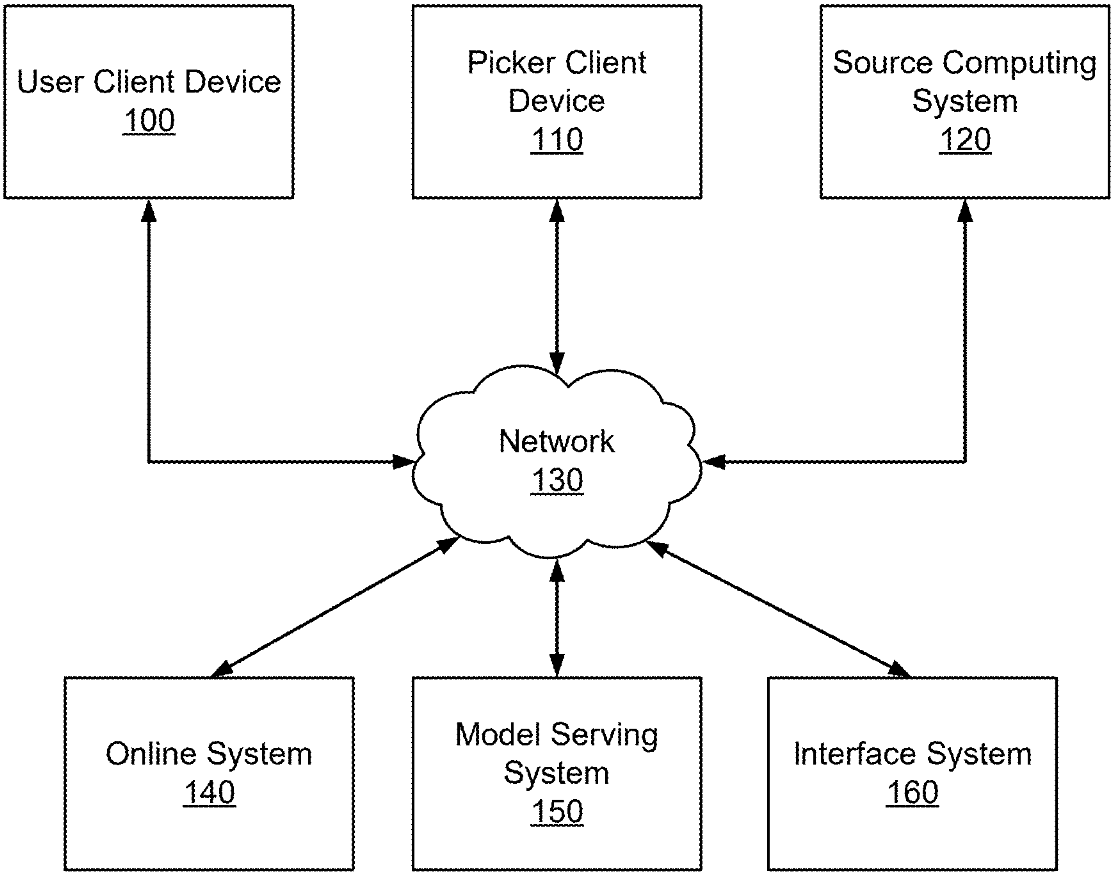
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, an online system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 enables a user to create an order for a household associated with the user based on the user's online calendar. The user shares an online calendar with the online system 140, which includes information about activities for each member in the household. The online system 140 translates the online calendar into a set of meal needs for the household (e.g., specific recipes for four people) and then prompts a large language model (LLM) to suggest a recipe for each meal need. The online system 140 then prompts the LLM or other machine-learning model to select items from a specific source for fulfilling each recipe corresponding to the meal needs. The user can then edit and confirm the order for fulfillment.

Hence, the online system 140 presented herein allows for generating a shopping list (i.e., order, which includes source, delivery time, etc.) based on an online family calendar. The online system 140 automatically generates the shopping list with suggested delivery time windows from the online family calendar and organized by meal/activity with suggestions based upon previous purchase history as well as the type of meal and activity. In this manner, the online system 140 can automatically generate online orders based on the schedules and commitments noted in users' family calendars, previous order histories, and explicit preferences provided by users.

The model serving system 150 receives requests from the online system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model).

Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online system 140 employs an LLM of the model serving system 150 to generate a shopping list based on online calendar entries and additional user's data. The online system 140 may prepare (e.g., via a prompt generation module 250 in FIG. 2) a prompt for input to the LLM. The prompt may include a user's shared online family calendar, the user's past purchase history, the user's specified explicit preferences, and/or the user's budget information. The user's shared online family calendar may include information about which meals among breakfast/lunch/dinner meals are at home, information about adult activities (e.g., conferences, workouts, monthly date night out, etc.), information about children's activities by type and length, some other data, or some combination thereof. The user's past purchase history input into the LLM may help determine, e.g., the implicit dietary preferences of the user, and/or source preferences of the user. The user's budget information can be obtained from the user's past order history or via explicit feedback from the user.

The LLM may generate a response to each prompt input into the LLM based on execution of the machine-learning model using the prompt. A first response to a first prompt may include a list of meals (or recipes) for the user's family. The online system 140 may import the first response from the model serving system 150 and use the first response as part of a second prompt input into the LLM. A second response to the second prompt may include a shopping list of items along with quantities and one or more sources for servicing the list of items (i.e., online order). The online system 140 may import the second response from the model serving system 150 and use the second response to generate a user interface signal that causes the user client device 100 to display details of the order.

The online system 140 may utilize a chained set of prompts to iteratively construct an output list of items. At the first step, the online system 140 may prompt the LLM to construct a meal plan given an online calendar. The online system 140 may take the user's provided weekly online calendar together with the user's dietary preferences and/or cuisine preferences along with restrictions and allergy information as input into the prompt. The online system 140 may iterate over the generated list of meals/recipes and update the list of meals/recipes given special events in the calendar (e.g., birthdays, lifestyle entries, etc.). The list of meals/recipes output by the LLM may be grouped by: (1) type and number of meals (e.g. breakfast at home×("times") 5, brunch×1, breakfast to go×1, packed lunch for child 1 and child 2×5, dinner for two at home×5, dinner on the go for two×4, etc.); (2) a product recommended for special activities (e.g., birthday gift ideas for child 1, softball game snacks for child 2, etc.); and (3) recommended nutrition or product for routines during the week (e.g., electrolytic water for pre- and during workout hydration, protein powder for after workout muscle building, etc.).

The LLM may convert, using information about the meal quantities, the user's source preferences, the user's item preferences, the generated list of meals/recipes into a shopping list of items along with their quantities. The generated output list of items may be input to a next set of machine-learning models that can recall and rank the items by utilizing the user's feedback along the way to generate the final list of items. Outputs generated by the LLM may be especially useful for parsing the online calendar and generating a list especially for users who did not share their online calendars before. Hence, the users' feedback is important in these cases to tune the LLM output based on the users' preferences. In the case where the user has already onboarded their online calendar onto the online system 140, their prior order history can be used both as a contextual input to the LLM and also to tune the generated list of items (e.g. by quantities, brand preferences, etc.).

The LLM may first construct a meal plan given an online calendar. The online system 140 may export the online calendar (e.g., in the Internet Calendar and Scheduling (ICS) format) from the user client device 100. The online system 140 may then parse the exported online calendar (e.g., via a calendar receiver module 225 in FIG. 2) to generate a list of events along with their metadata. The list of events and the metadata may be included (e.g., via the prompt generation module 250) into a prompt for input into the LLM. Optionally, the prompt may further include information about the user's dietary preferences, information about the user's allergies, information about the user's cuisine preferences, some other user-related data, or some combination thereof. Additionally, the following example request can be included into the prompt for input into the LLM.

"Can you provide a meal plan for the entire week based on the events in the calendar, categorized by breakfast, lunch, dinner, snack, and quantity?"

A response generated by the LLM may include a meal plan for a defined time period (e.g., one week). An example response generated by the LLM can be the following.

"Here's a meal plan for the entire week, organized by breakfast, lunch, dinner, and snacks, with quantities for your family of four.

Monday

Breakfast (7:30-8:00 am): Scrambled eggs (4 eggs); Whole wheat toast (8 slices); Fruit (4 servings); Milk (4 glasses).

Lunch (Packed for kids): Turkey & cheese sandwiches (2 sandwiches); Carrot sticks (2 servings); Apple slices (2 apples); Water bottles (2 bottles).

Dinner (6:00-7:00 pm): Grilled chicken breast (2 portions); Steamed broccoli (2 servings); Brown rice (2 cups).

Snacks: Yogurt (4 servings); Mixed nuts (4 servings).

Tuesday

Breakfast (7:30-8:00 am): Oatmeal with berries (4 bowls); Orange juice (4 glasses).

Lunch (Packed for kids): Ham & cheese wraps (2 wraps); Cucumber slices (2 servings); Grapes (2 servings); Water bottles (2 bottles).

Dinner (6:00-7:00 pm): Spaghetti with marinara sauce (2 portions); Mixed green salad (2 servings); Garlic bread (4 slices).

Snacks: Granola bars (4 bars); Cheese sticks (4 servings).

Wednesday

Breakfast (7:30-8:00 am): Pancakes with maple syrup (12 pancakes); Fresh berries (4 servings); Milk (4 glasses).

Lunch (Packed for kids): Peanut butter & jelly sandwiches (2 sandwiches); Baby carrots (2 servings); Banana (2 bananas); Water bottles (2 bottles).

Dinner (6:00-7:00 pm): Baked salmon (2 portions); Quinoa (2 cups); Asparagus (2 servings).

Snacks: Apple slices with peanut butter (4 apples); Trail mix (4 servings).

Thursday

Breakfast (7:30-8:00 am): Greek yogurt with granola and honey (4 servings); Fresh fruit (4 servings).

Lunch (Packed for kids): Chicken salad sandwiches (2 sandwiches); Cherry tomatoes (2 servings); Pears (2 pears); Water bottles (2 bottles).

Dinner (6:00-7:00 pm): Beef stir-fry with vegetables (2 portions); Brown rice (2 cups).

Snacks: Hummus with veggie sticks (4 servings); Crackers (4 servings).

Friday

Breakfast (7:30-8:00 am): Bagels with cream cheese (4 bagels); Smoothies (4 servings).

Lunch (Packed for kids): Tuna sandwiches (2 sandwiches); Celery sticks (2 servings); Oranges (2 oranges); Water bottles (2 bottles)

Dinner (6:00-7:00 pm): BBQ chicken (2 portions); Corn on the cob (2 servings); Coleslaw (2 servings).

Snacks: Popcorn (4 servings); Yogurt (4 servings)

Saturday

Breakfast (8:00-11:00 am): Brunch for 4: Scrambled eggs (8 eggs); Sausages (8 links); Pancakes (12 pancakes); Fresh fruit (4 servings); Coffee/juice (4 servings).

Lunch (Packed for Kid 1): Sandwich (1 sandwich); Snack: Trail mix (1 serving); Water bottle (1 bottle).

Lunch (Packed for Kid 2): Softball Game Snacks: Mini sandwiches (10); Juice boxes (10); Apple slices (10 servings).

Dinner (6:00-7:00 pm): Pizza (1 large pizza); Caesar salad (4 servings).

Snacks: Ice cream (4 servings); Fresh fruit (4 servings)

Sunday

Breakfast (8:00-11:00 am): Brunch for 4: French toast (8 slices); Bacon (8 slices); Fruit salad (4 servings); Coffee/juice (4 servings).

Lunch: (Packed for Kid 1): Snack (1 serving); Water bottle (1 bottle).

Dinner (6:00-7:00 pm): Roast chicken (4 servings), Mashed potatoes (4 servings), Green beans (4 servings).

Snacks: Chocolate chip cookies (4 servings); Cheese and crackers (4 servings).

This plan provides balanced meals and snacks throughout the week, accommodating your family's schedule."

The online system 140 may then prompt the LLM to convert the meal plan for the defined time period (e.g., the entire week) into a shopping list. An example request that can be included into a prompt for input into the LLM is:

"Can you prepare the weekly grocery shopping list based upon above info?"

A response generated by the LLM may include a shopping list for the defined time period (e.g., the entire week). An example response generated by the LLM can be the following.

"Here's a grocery shopping list based on the weekly meal plan provided:

Proteins—Eggs: 12; Chicken breast: 4 portions; Ground beef: 2 portions; Salmon: 2 portions; Sausages: 8 links; Bacon: 8 slices; Deli turkey: 4 servings; Deli ham: 4 servings; Tuna: 2 cans; Chicken for roasting: 4 portions; Peanut butter: 1 jar.

Dairy—Milk: 2 gallons; Greek yogurt: 2 large tubs; Cheese sticks: 4 servings; Cream cheese: 1 tub; Mozzarella cheese (for sandwiches and snacks): 1 block or pack; Butter: 1 stick.

Breads and Grains—Whole wheat bread: 2 loaves; Bagels: 4; Tortilla wraps: 4; Brown rice: 1 bag; Quinoa: 1 bag; Spaghetti: 1 box; Pancake mix: 1 box; Whole wheat crackers: 1 box; Granola: 1 box; Cereal: 1 box.

Fruits—Apples: 14; Bananas: 10; Grapes: 2 bunches; Oranges: 4; Pears: 4; Berries (strawberries, blueberries): 4 packs; Fruit salad mix (for brunch): 1 large container; Fruit for skewers (for birthday party): 1 large container.

Vegetables—Carrots: 1 bag; Celery: 1 bunch; Cucumber: 4; Cherry tomatoes: 2 pints; Lettuce (for salad): 2 heads or 1 large bag; Broccoli: 2 heads; Asparagus: 1 bunch; Bell peppers: 3; Avocado: 2; Corn on the cob: 2 cobs; Green beans: 1 pound.

Pantry Staples—Peanut butter: 1 jar; Marinara sauce: 1 jar; Hummus: 1 tub; Olive oil: 1 bottle; Maple syrup: 1 bottle; Honey: 1 bottle; Soy sauce: 1 bottle; Garlic: 1 bulb; Salt, pepper, and other seasonings.

Snacks—Granola bars: 1 box; Trail mix: 1 bag; Mixed nuts: 1 bag; Yogurt: 4 packs; Crackers: 1 box; Ice cream: 1 tub; Chocolate chip cookies: 1 pack or ingredients to bake Drinks—Orange juice: 2 cartons; Coffee: 1 pack or tin; Tea: 1 box; Water bottles: 1 case Frozen—Frozen pizza: 1 large This list should cover all the meals and snacks for the week. Adjust quantities as needed based on your family's preferences and consumption."

The response including the shopping list may be imported from the model serving system 150 into the online system 140. The online system 140 may then convert (e.g., via an order management module 220 in FIG. 2 or via the LLM) the shopping list into a list of items (i.e., order) that can be picked from one or more source locations and delivered to the user.

In one or more embodiments, the task for the model serving system 150 is based on knowledge of the online system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
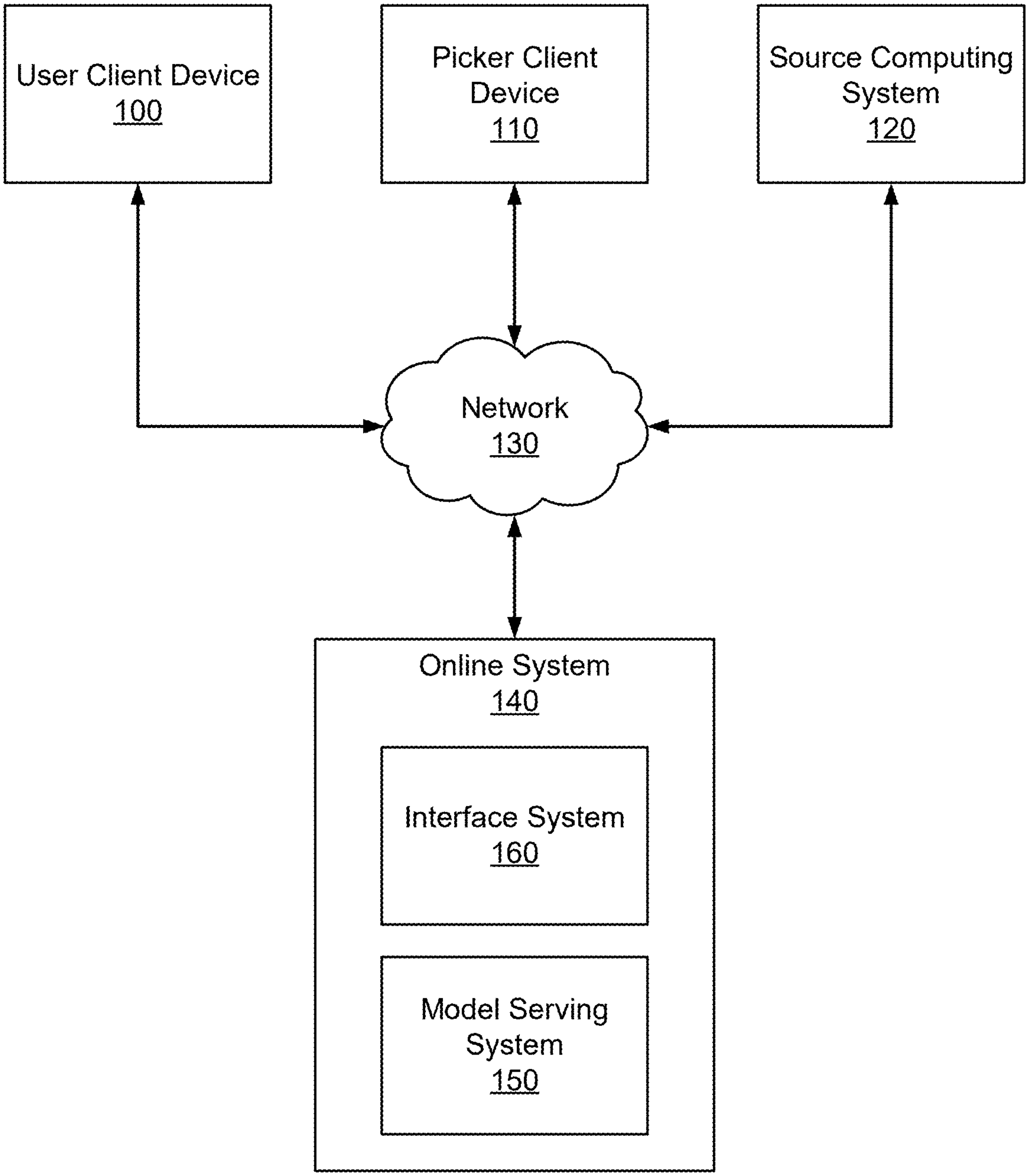
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Figure 2:
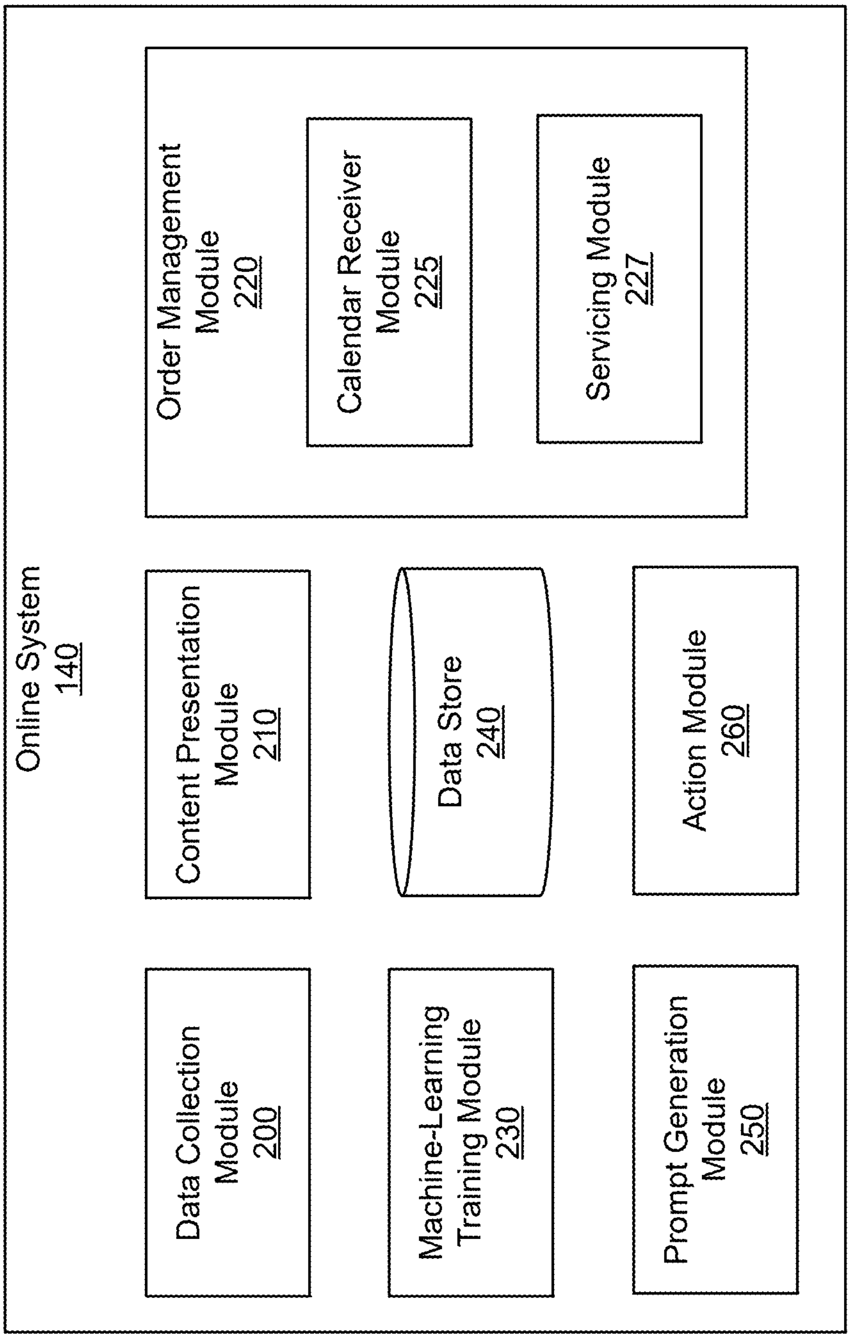
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a prompt generation module 250, and an action module 260. The order management module 220 may include a calendar receiver module 225 and a servicing module 227. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In one or more embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In one or more embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In one or more embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online system 140. In one or more other embodiments, when the model serving system 150 is included in the online system 140, the machine-learning training module 230 may further train parameters of the machine-learning model based on data specific to the online system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

A user may request the online system 140 to generate a shopping list of items based on their online calendar. The user may share the online family calendar with the online system 140. The user may also share family details, such as a number of parents, number of children, ages of family members, special dietary needs of family members, etc. The calendar receiver module 225 may receive the shared online family calendar and any other related shared data. In such a manner, the calendar receiver module 225 may link the users' online calendar to the online system 140. Additionally, the calendar receiver module 225 may also obtain from the user (e.g., from the user client device 100 via the network) information about any items that were not consumed from the last week, information about any items that were missing from the previous order that resulted in an additional trip to a source location, etc.

Users who shared their online calendars with the online system 140 may have the option to come up with the first few shopping lists that would match the online calendar entries. Information about the shopping lists generated in this manner may be utilized for personalized tuning of an LLM (e.g., LLM of the model serving system 150). The calendar receiver module 225 may capture routine data alongside the calendar data, which can be then used to tune the LLM, as well as to adjust and/or recommend the weekly meal plan. The LLM may be able to modify the quantities of food based on how many of the family members will be home for dinner and/or in town, as well as to automatically incorporate the dietary requirements of guests to special events in the calendar. The calendar receiver module 225 may pass the received and parsed calendar data to the prompt generation module 250.

The prompt generation module 250 may generate prompts for input into the LLM, as well as to prompt the LLM to generate specific outputs, such as a meal plan, recipe, and/or a shopping list of items. In one or more embodiments, the prompt generation module 250 prompts the LLM for recipe planning. In such cases, the prompt generation module 250 may prompt the LLM to translate the calendar data into a set of meal needs. The first prompt input into the LLM may include the calendar data and information about the family composition. A first output generated by the LLM may include a listing of meals for which the user needs to shop during a time period (e.g., week), and how many people are to be served each meal. The prompt generation module 250 may then prompt the LLM to suggest a recipe for each meal based on the meal needs. The second prompt input into the LLM may include the meal need (e.g., dinner, for two people) from the first output, context information (e.g., location, weather, etc.), information about a time needed to prepare (e.g., cook) the meal, some other information, or some combination thereof. The prompt generation module 250 may retrieve information about a time needed to prepare a specific meal from a meal catalog database (e.g., stored at the data store 240). A second output generated by the LLM may include a suggested recipe. After that, the prompt generation module 250 may prompt the LLM (or some other machine-learning model) to pick items for fulfilling the recipe.

In one or more other embodiments, the prompt generation module 250 prompts the LLM for volume prediction. The online system 140 has the knowledge (e.g., stored at the data store 240) about the typical weekly shopping for the family, in term of items purchased and their quantity. In such cases, the LLM may be utilized to extract information from the user's online calendar. From the calendar data, the order management module 220 may determine what percentage of a weekly volume is needed, based on the family members who will be present for meals that week. Then, the prompt generation module 250 may prompt the LLM to generate a shopping list of items based on the predicted volume.

In providing the prompt to the LLM, the prompt generation module 250 may provide the calendar data including information about activities of different family members from which the LLM can infer which meals among the breakfast, lunch and dinner will be at home and thus need to be shopped for, such as information about adult activities (e.g. conferences, workouts, monthly date night out, etc.) and children's activities. Example activities included into the prompt can be the following weekly activities for child 1 in a household: "dance class M/W 4-6 pm F 4-7 pm; honor band T 4-5:30 pm; softball team practice T/W 6:30-8 pm; private class Th 4-5 pm; another private class Th 6-7 pm; softball game Sat 9-10 am, prepare snacks for the entire team (ten 6 yro kids); chess class Sat 10-11 am; girl scouts Sat 1-2:30 pm; language class Sat 4-6 pm; Sun: dance competition-snack, dinner outside." Example activities included into the prompt can be the following weekly activities for child 2 in the household: "afterschool M-F 3-6 pm; drawing class W 6:30-7:30 pm; friend's birthday party (6 yro girl) Sat 11-2 pm; language class Sat 4-6 pm; Sun: dance competition-snack, lunch outside."

In providing the prompt to the LLM, the prompt generation module 250 may further provide information about the user's/family's past purchase history (e.g., to determine the implicit dietary preferences of the user/family), user's/family's preferences, budget information (e.g., obtained from the user's past order history or via explicit feedback), user's source preferences, user specified explicit preferences, some other information, or some combination thereof.

An output generated by the LLM may include a shopping list grouped by meals and recommended special products (e.g., if a birthday is on the calendar). The LLM may auto-generate the weekly grocery shopping list based upon the calendar entries, with breakdowns by meals (e.g., breakfast, dinner), activities (e.g., weekday dance practices, weekend softball game), special events (e.g., birthday party, company social, etc.), and travel plans and longer breaks (e.g., spring break, ski travel, etc.). In one or more embodiments, the LLM may generate a list of meals grouped by the number of meals (by variety) and by activities.

One example output list generated by the LLM is the following.

Breakfast: "Quick weekday breakfast×5—oatmeal×1, raisin×1, celery×1 bunch, carrot c 1 bag, eggs×5×4; Relaxed weekend brunch×1; Weekend breakfast on the go×1."

Lunch: "Weekday packed lunch×5; Weekend lunch likely not at home hence no grocery is currently planned for at home lunch."

Dinner: "(i) 4 people dinner at home×2: Recipe 1 (if manually edited, that is labeled data that can be used to refine/tune the LLM to give better personalization); Recipe 1: key ingredient 1, key ingredient 2, key ingredient 3; Recipe 2: key ingredient 1, key ingredient 2, key ingredient 3. (ii) 2 people dinner at home×4: Recipe 3, Recipe 4, Recipe 5, Recipe 6. (iii) 2 people dinner on the go×4: Frozen dinner recommendation 1; Frozen dinner recommendation 2; Local grocery deli option 1 (pick up—won't add to the current grocery list but will remind you on the day once you select this); Local grocery deli option 2 (pick up—won't add to the current grocery list but will remind you on the day once you select this)."

Snack: "5 snacks for every afternoon between school and afterschool: Recommendation 1×3, Recommendation 2×2, Recommendation 3 (not in the shopping list but can be swapped with other selected recommendations); 10 portions of snacks for weekday softball practice; 4 portions of snacks for weekend dance competition."

Birthday Party: "Birthday card recommendations; Birthday gift candidates for 6 years old girl."

Company Social: "Popular lipstick at Source A (promotion opportunity for non-grocery sources); Popular earring from a local brand (promotion opportunity for emerging brands); Editor recommended outfit for evening social from Source B (promotion opportunity for department stores).

Workout Routine: "Recommended nutrition/products for family member 1's 3× jogging each week. Example 1: Time to treat yourself to a new pair of comfortable jogging shoes? Example 2: anti-sweating sunscreen. Recommended nutrition/products for family member 2's 2× workout each week. Example 1: electrolytic water for pre and during workout hydration; Example 2: protein powder for after-workout muscle building."

The prompt generation module 250 may generate a second prompt for input into the LLM that includes the list of meals as generated above and additional user's preferences, such as source preferences, brand preferences, etc. Based on the second prompt, the LLM may generate a final shopping list of items grouped by meal/activities with recommended yet adjustable items and quantities under recipes/rationales for users to review and edit.

The servicing module 227 may automatically schedule deliveries for times when the family members are at home. The user may utilize a user interface of the user client device 100 to set preferred order delivery times and days as defaults. The servicing module 227 may also automatically pause deliveries or recommendations when the family members are traveling outside of a defined service area. Furthermore, the servicing module 227 may check whether the delivery address matches where the family is located. The servicing module 227 may automatically schedule delivery on the way home from vacation.

To avoid food waste, the calendar receiver module 225 may parse through the calendar entries and notice travel or other indications of low demand. Then, the servicing module 227 may pause subscription orders when the family is traveling. Additionally, changes to the calendar may cause a change to the orders. For example, the cancellation of a meeting changes the demand for a meal since all four family members will be present for a dinner. In such cases, the servicing module 227 may add quantities to the order based on the changed demand.

Based on online calendars shared by users of the online system 140 and the knowledge of when people will order certain items, the action module 260 may generate demand signals that can be sent, via the network 130, to source computing systems 120 to help sources estimate demand for certain items. In this manner, the online system 140 can help sources avoid food waste when lots of people will be on vacation/out of town (e.g., during the summer). Additionally, using the calendar data, the action module 260 may generate a recommendation signal that can be sent, via the network 130, to the user client device 100 to recommend to the user what is a preferred day for the order in order to avoid food waste. Furthermore, based on the calendar data, the action module 260 may generate a notification signal that causes the user client device to generate a user interface with an alert message, e.g., "You are ordering too much before you are going on vacation." Additionally, the action module 260 may provide corresponding signals to third-party entities associated with the online system 140 (e.g., advertisers) and share information about the users' weekly orders so that the third-party entities can generate corresponding promotions and/or ads in relation to various items.

The online system 140 presented herein may proactively recommend/suggest orders based upon activities and schedules found in online calendars. The online system 140 can not only help busy parents easily finish a well-planned weekly online grocery shopping, but can also have the intelligent and caring function to promote a healthy routine for both children and parents—as the parents need to care for themselves to maintain their best state for both work and family responsibilities. For example, if the husband has a routine of workout three days a week (e.g. lifting), the online system 140 can proactively recommend, based on corresponding activities found in an online calendar, the best after-workout meals or proteins to maximize the effectiveness of muscle build-up after lifting. Similarly, if the wife sets out some time on the calendar for jogging every morning before children wake up, the online system 140 can proactively recommend some comfortable jogging clothes/shoes (e.g., in collaboration with general sources, or directly with consumer-packaged goods (CPG) entities). If child 1 has a very busy schedule due to extracurricular activities, the online system 140 can proactively recommend quick and healthy snacks to replenish the child's energy throughout the day. If child 2 is at the age of a growth burst, the online system 140 can proactively recommend specific healthy meals for children at this age with guidance from a health organization. Third-party entities associated with the online system 140 (e.g., advertisers) can also utilize this opportunity to reach out to CPG entities that target these segments of users (e.g., parents with young children).

In one or more embodiments, instead of having individual users of the online system 140 sharing their online calendars, business entities can also share their online calendars. In such cases, the online system 140 presented herein may allow for predictable office restocking, as well as for automatically generating orders for specific events, such as office parties.

In one or more embodiments, the action module 260 applies a user preference model (e.g., machine-learning model) that is trained to predict user's implicit dietary preferences, such as gluten-free, organic, vegan, dairy-free, etc. The implicit dietary preferences may be also separated into short-term dietary preferences and long-term dietary preferences. The action module 260 may deploy the user preference model to run a machine-learning algorithm to the user's order history to output scores for each dietary preference, where a higher value of a score indicates a higher level of a corresponding dietary preference. A set of parameters for the user preference model may be stored at one or more non-transitory computer-readable media of the action module 260. Alternatively, the set of parameters for the user preference model may be stored at one or more non-transitory computer-readable media of the data store 240.

In one or more embodiments, the user preference model is a two-tower machine-learning model having a transformer architecture that is trained using user's and items' features. The two-tower machine-learning model may utilize the user's representation embeddings to infer the user's dietary preferences.

The machine-learning training module 230 may perform initial training of the user preference model using training data. The machine-learning training module 230 may generate the training data based on empirical observations using priors for each user's feature and update the posteriors for each user using Bayesian updates. The machine-learning training module 230 may train the user preference model using the training data to generate initial values for the set of parameters of the user preference model.

The weekly calendar, the user's dietary preferences, and any user specified explicit preferences may be passed by the prompt generation module 250 to the LLM as contextual data. The LLM may generate a list of queries using the contextual data. Additionally, using the contextual data, the LLM may generate a quantity per item. This is especially useful for cold start type scenarios where there is no prior information about the user or recipes. For cases where the user's order history is available, the user's order history can be input into the LLM to generate the quantity information using a forecasting algorithm that is based on how much the user might still have remaining items and how much more is needed based on the user's schedule.

Once the initial list of meals is generated, the user may utilize a user interface of the user client device 100 to update the initial list, e.g., to edit meal plans, activities, and/or products. The user's edits may be passed to the LLM for re-generating the list of meals based on the new input in an interactive fashion. Once the list of meals is finalized, the LLM may be prompted to generate a final list of items (i.e., order). The user's feedback may be also used (e.g., via the model serving system 150) to tune the quantity forecasting algorithm at the LLM.

In one or more embodiments, once the list of queries are generated by the LLM, the list of queries are passed to a search engine of the online system 140 to recall and rank the items. The recall and ranking stage may take care of personalizing the items based on the user's dietary preferences. For each query in the list of queries generated by the LLM, the servicing module 227 may generate one or more corresponding items that are then compiled into the final shopping list (i.e., the final order).

Figure 3:
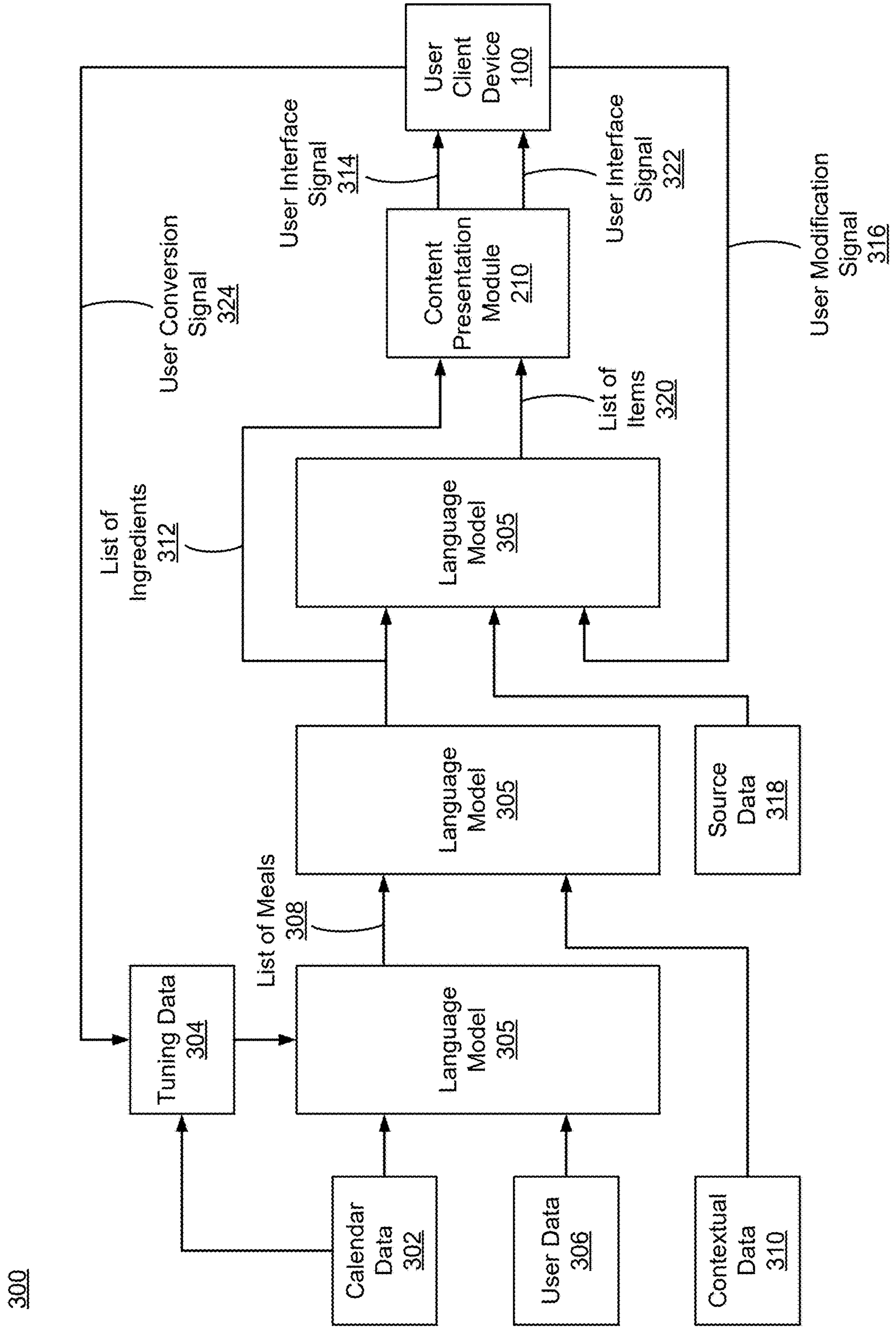
FIG. 3 illustrates an example architectural flow diagram of using a language model to create an online order from online calendar entries shared by a user of an online system, in accordance with one or more embodiments.

FIG. 3 illustrates an example architectural flow diagram 300 of using a language model 305 (e.g., LLM of the model serving system 150) to create an online order from online calendar entries shared by a user of the online system 140, in accordance with one or more embodiments. The user may utilize the user client device 100 to share calendar data 302 related to online calendar entries for the user and one or more other people related to the user (e.g., one or more user's family members). The language model 305 may be tuned (e.g., via the model serving system 150) using tuning data 304 with information about past conversion data for the user (e.g., retrieved from the data store 240) and past calendar-based conversion data inferred from the calendar data 302. In addition to the calendar data 302, the prompt generation module 250 may further provide user data 306 to the language model 305. In providing the user data 306 to the language model 305, the prompt generation module 250 may provide information about user's (or family's) past purchase history, information about user's (or family's) implicit dietary preferences, information about a user's preferred budget for a defined time period (e.g., weekly budget), user's source preferences, user's explicit dietary preferences (e.g., allergy information), some other user-related data, or some combination thereof.

Based on the calendar data 302 and the user data 306, the language model 305 may generate a response including a list of meals 308 for the defined time period. The prompt generation module 250 may include the list of meals 308 into another prompt for input into the language model 305. In addition to the list of meals 308, the prompt generation module 250 may further provide contextual data 310 to the language model 305. In providing the contextual data 310 to the language model 305, the prompt generation module 250 may provide information about a current location of the user, a time required to prepare a corresponding meal from the list of meals 308, information about current weather, some other information, or some combination thereof.

Based on the list of meals and the contextual data 310, the language model 305 may generate a list of ingredients 312 (e.g., recipe) that corresponds to the list of meals 308. The prompt generation module 250 may include the list of ingredients 312 into yet another prompt for input into the language model. Additionally, the list of ingredients 312 may be also passed to the content presentation module 210. The content presentation module 210 may use the list of ingredients 312 to generate a user interface signal 314 that is sent to the user client device 100 via the network 130. The user interface signal 314 may cause the user client device 100 to display a user interface with the list of ingredients 312 for viewing by the user. The user may then utilize user interface elements of the user interface to modify as desired the list of ingredients 312. The user client device 100 may then generate a user modification signal 316 with information about one or more modifications to the list of ingredients 312 made by the user. The user modification signal 316 may be provided as an additional input signal to the language model 305. In addition to the list of ingredients 312 and the user modification signal 316, the prompt generation module 250 may provide source data 318 with information about items available at one or more specific locations that are preferred by the user.

Based on the list of ingredients 312, the user modification signal 316, and the source data 318, the language model 305 may generate a list of items 320 (i.e., order) for conversion by the user. The list of items 320 may correspond to the list of ingredients 312 (with or without the user's modification) and the list of meals for the defined time period (e.g., one week). Information about the list of items 320 may be provided to the content presentation module 210. The content presentation module 210 may use the list of items 320 to generate a user interface signal 322 that is sent to the user client device 100 via the network 130. The user interface signal 322 may cause the user client device 100 to display a user interface with the list of items 320 and information about the one or more source locations where items from the list of items 320 are available.

The user may utilize user interface elements of the user interface to add the list of items 320 to a cart for purchase. The online system 140 may then assign a picker for servicing the order and delivery of the list of items 320 to a user's location. Alternatively, once the list of items 320 (i.e., order) is generated, the online system 140 may automatically schedule a delivery of the list of items 320 to the user's location over a specific delivery time window (e.g., as pre-selected by the user). For example, the online system 140 may automatically schedule a weekly delivery of the list of items 320 to the user's location. Information about the user's conversion of the list of items 320 (or a portion of the list of items) may be recorded at the user client device 100 as a user conversion signal 324. The user client device 100 may communicate, via the network 130, the user conversion signal 324 to, e.g., the model serving system 150. The model serving system 150 may utilize the user conversion signal 324 as part of the tuning data 304 for retuning of the language model 305.

Figure 4:
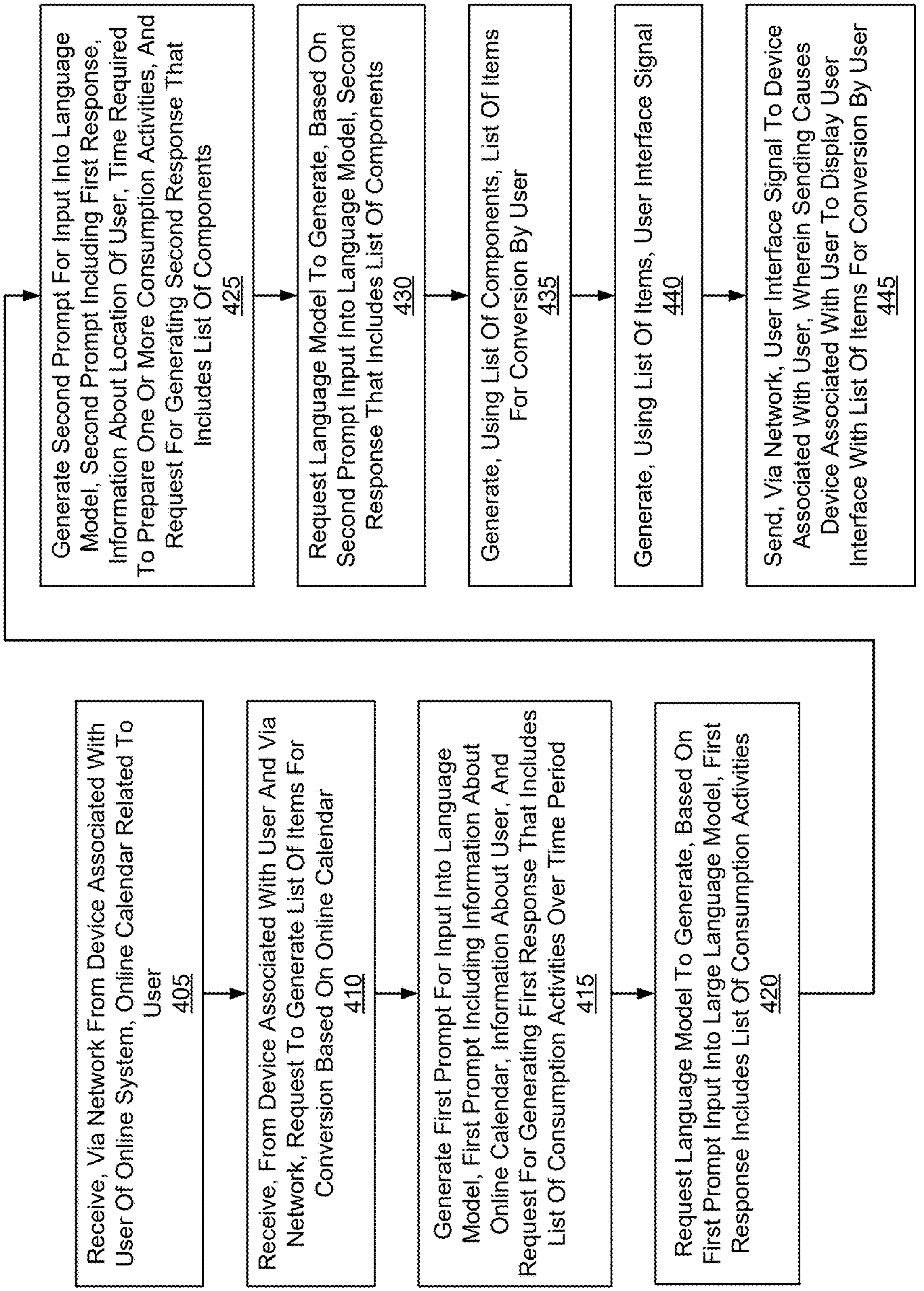
FIG. 4 is a flowchart for a method of using a language model to create an online order from online calendar entries shared by a user of an online system, in accordance with one or more embodiments.

FIG. 4 is a flowchart for a method of using a language model (e.g., the language model 305 or an LLM of the model serving system 150) to create an online order from online calendar entries shared by a user of an online system, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 receives 405 (e.g., at the calendar receiver module 225), via a network (e.g., the network 130) from a device associated with a user of the online system 140 (e.g., the user client device 100), an online calendar related to the user. The online system 140 receives 410 (e.g., at the calendar receiver module 225), from the device associated with the user and via the network, a request to generate a list of items for conversion based on the online calendar. The online system 140 may infer (e.g., via the calendar receiver module 225), from the online calendar, the information about the online calendar including at least one of: information about activities of the user and one or more other people related to the user (e.g., user's family members) during the time period, past conversion data for the user and the one or more other people, information about preferences for the user and the one or more other people (e.g., dietary preferences), information about one or more non-reoccurring events (e.g., special events, such as birthdays) related to the user and the one or more other people, or a budget of the user for the time period.

The online system 140 may retrieve (e.g., via the data collection module 200), from a database of the online system 140 (e.g., the data store 240), past conversion data for the user (e.g., information about historical user's purchases and orders). The online system 140 may infer (e.g., via the calendar receiver module 225), from the online calendar, past calendar-based conversion data for the user. The online system 140 may generate (e.g., via the machine-learning training module 230) tuning data including information about the past conversion data and the past calendar-based conversion data. The online system 140 may tune (e.g., via the model serving system 150) the language model using the tuning data.

Responsive to receiving the request, the online system 140 generates 415 (e.g., via the prompt generation module 250) a first prompt for input into the language model (e.g., LLM of the model serving system 150), the first prompt including information about the online calendar, information about the user, and a request for generating a first response that includes a list of consumption activities (e.g., meals) over a time period (e.g., one week). The online system 140 requests 420 (e.g., via the prompt generation module 250) the language model to generate, based on the first prompt input into the language model, the first response that includes the list of consumption activities.

The online system 140 generates 425 (e.g., via the prompt generation module 250) a second prompt for input into the language model, the second prompt including the first response, information about a location of the user, a time required to prepare one or more consumption activities from the list of consumption activities, and a request for generating a second response that includes a list of components (e.g., list of ingredients or recipe) related to the list of consumption activities. The online system 140 may retrieve (e.g., via the prompt generation module 250) information about a time needed to prepare a specific consumption activity (e.g., meal) from the data store 240. The online system 140 requests 430 (e.g., via the prompt generation module 250) the language model to generate, based on the second prompt input into the language model, the second response that includes the list of components.

The online system 140 may generate (e.g., via the content presentation module 210), using the list of consumption activities, a second user interface signal. The online system 140 may send (e.g., via the content presentation module 210), via the network, the second user interface signal to the device associated with the user, wherein the sending the second user interface signal causes the device associated with the user to display the user interface with the list of consumption activities. The online system 140 may receive (e.g., at the order management module 220), from the device associated with the user and via the network, a user signal including information about one or more modifications made to the list of consumption activities by the user via the user interface. The online system 140 may generate the second prompt by including (e.g., via the prompt generation module 250) in the second prompt the information about one or more modifications made to the list of consumption activities.

The online system 140 generates 435 (e.g., via the order management module 220 or the prompt generation module 250), using the list of components, the list of items (i.e., order) for conversion by the user. The online system 140 may generate (e.g., via the content presentation module 210), using the list of components, a second user interface signal. The online system 140 may send (e.g., via the content presentation module 210), via the network, the second user interface signal to the device associated with the user, wherein the sending the second user interface signal causes the device associated with the user to display the user interface with the list of components. The online system 140 may receive (e.g., at the order management module 220 or the prompt generation module 250), from the device associated with the user and via the network, a user signal including information about one or more modifications made to the list of components by the user via the user interface. The online system 140 may generate, further using the user signal, the list of items for conversion by the user.

The online system 140 may generate (e.g., via the prompt generation module 250) a third prompt for input into the language model, the third prompt including the second response, information about a source, and a request for generating a third response that includes the list of items for conversion by the user from the source. The online system 140 may request (e.g., via the prompt generation module 250) the language model to generate, based on the third prompt input into the language model, the third response that includes the list of items for conversion by the user from the source.

The online system 140 generates 440 (e.g., via the content presentation module 210), using the list of items, a first user interface signal. The online system 140 sends 445 (e.g., via the content presentation module 210), via the network, the first user interface signal to the device associated with the user, wherein the sending the first user interface signal causes the device associated with the user to display a user interface with the list of items for conversion by the user.

In one or more embodiments, the online system 140 may automatically add (e.g., via the servicing module 227) the list of items to a cart of the user. In such cases, the online system 140 may schedule (e.g., via the servicing module 227) an automatic delivery of the list of items to a delivery location of the user by generating a signal that triggers the automatic delivery. In one or more embodiments, the servicing module 227 is configured as an artificial intelligence agent to automatically add the list of items to the cart and convert on the list of items for the user, e.g., after the user granted permission in advance for an automatic conversion of items. The online system 140 may approve (e.g., via the servicing module 227) the automatic conversion of items based on relevance of items in the list and confidence scores for the list of items inferred by the language model that are above a threshold score, which is indicative that the user would convert on the list of items. Based on the first prompt, the second prompt, and/or the third prompt, the language model may infer a confidence score for an item that is indicative of a likelihood of the user converting on the item.

The online system 140 may generate (e.g., via the prompt generation module 250) a third prompt for input into the language model, the third prompt including the information about the online calendar, and a request for generating a third response that includes a volume of items converted by the user over a first time period. The online system 140 may request (e.g., via the prompt generation module 250) the language model to generate, based on the third prompt input into the language model, the third response that includes the volume of items converted by the user over the first time period. The online system 140 may identify (e.g., via the order management module 220), using the information about the online calendar and the volume of items, a portion of the volume of items for conversion by the user over a second time period following the first time period. The online system 140 may generate (e.g., via the order management module 220 or the prompt generation module 250), using information about the portion of the volume of items, a second list of items for conversion by the user over the second time period. The online system 140 may generate (e.g., via the content presentation module 210), using the second list of items, a second user interface signal. The online system 140 may send (e.g., via the content presentation module 210), via the network, the second user interface signal to the device associated with the user, wherein the sending the second user interface signal causes the device associated with the user to display the user interface with the second list of items for conversion by the user. When generating the second list of items, the online system 140 may generate (e.g., via the prompt generation module 250) a fourth prompt for input into the language model, the fourth prompt including the information about the portion of the volume of items, information about a source, and a request for generating a fourth response that includes the second list of items for conversion by the user from the source. The online system 140 may request (e.g., via the prompt generation module 250) the language model to generate, based on the fourth prompt input into the language model, the fourth response that includes the second list of items for conversion by the user from the source.

The online system 140 may identify (e.g., via the servicing module 227), using the information about the online calendar, that the user and one or more other people related to the user (e.g., user's family members) are at a delivery location of the user over a specific time period. The online system 140 may schedule (e.g., via the servicing module 227 configured as an artificial intelligence agent) an automatic delivery of at least a portion of the list of items to the delivery location for the specific time period by generating a signal that triggers the automatic delivery.

The online system 140 may identify (e.g., via the servicing module 227), using the information about the online calendar, that the user and one or more other people related to the user (e.g., user's family members) are outside of a servicing area of the online system 140 over a specific time period. The online system 140 may pause (e.g., via the servicing module 227) a delivery of at least a portion of the list of items to a delivery location of the user during the specific time period by generating a signal that triggers pausing of the delivery.

The online system 140 may infer (e.g., via the calendar receiver module 225), from the online calendar, one or more changes made to the online calendar for a second time period following the time period. The online system 140 may generate (e.g., via the prompt generation module 250) a third prompt for input into the language model, the third prompt including information about the one or more changes, the list of consumption activities, the list of components, and a request for generating a third response that includes a second list of items for conversion by the user over the second time period. The online system 140 may request (e.g., via the prompt generation module 250) the language model to generate, based on the third prompt input into the language model, the third response that includes the second list of items. The online system 140 may generate (e.g., via the content presentation module 210), using the second list of items, a second user interface signal. The online system 140 may send (e.g., via the content presentation module 210), via the network, the second user interface signal to the device associated with the user, wherein the sending the second user interface signal causes the device associated with the user to display the user interface with the second list of items for conversion by the user.

Embodiments of the present disclosure are directed to the online system 140 that uses a language model (e.g., LLM of the model serving system 150) to create an online order from online calendar entries shared by a user of the online system 140. At the first step, the online system 140 uses the language model to translate the online calendar data into a set of meals personalized for the specific user, i.e., the online system 140 is not generically planning an entire week's worth of meals. After that, the online system 140 applies the same or different language model to generate a final list of items (i.e., order) for conversion by the user. In this manner, the online system 140 can make online shopping for large families with busy schedules effortless.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

deploying, on a model serving system comprising supercomputing infrastructure with enhanced computing capability, a large language model comprising a transformer neural network architecture, wherein the transformer neural network architecture comprises a set of decoders, each decoder performing an attention operation that generates keys, queries, and values from input data to generate an attention output, and wherein the large language model is configured to receive sequential data tokenized into a sequence of input tokens and to generate a sequence of output tokens;

exporting, from a device associated with a user of the computer system, an online calendar related to the user in a file format;

parsing, by a receiver module of the computer system, the exported online calendar in the file format to generate parsed calendar data including a list of events in the online calendar and metadata for the list of events;

passing the parsed calendar data from the receiver module to a prompt generation module of the computer system;

receiving, from the device associated with the user and via a network, a request to generate a list of items for conversion based on the online calendar;

responsive to receiving the request, generating, by the prompt generation module, a first prompt for input into the large language model, the first prompt including the parsed calendar data, information about the user, and a request for generating a first response that includes a list of consumption activities over a time period;

requesting the large language model to generate, using the first prompt tokenized into the sequence of input tokens and processed by the attention operation of the transformer neural network architecture, the first response that includes the list of consumption activities as a sequence of output tokens;

importing the first response from the model serving system to the computer system;

generating, by the prompt generation module, a second prompt for input into the large language model, the second prompt including the first response, information about a location of the user, a time required to prepare one or more consumption activities from the list of consumption activities, and a request for generating a second response that includes a list of components related to the list of consumption activities;

requesting the large language model to generate, using the second prompt tokenized into the sequence of input tokens and processed by the attention operation of the transformer neural network architecture, the second response that includes the list of components as a sequence of output tokens;

generating, using the second response that includes the list of components, the list of items for conversion by the user;

generating, using the list of items, a first user interface signal; and sending, via the network, the first user interface signal to the device associated with the user, wherein sending the first user interface signal causes the device associated with the user to display a user interface with the list of items for conversion by the user.

2. The method of claim 1, further comprising:

retrieving, from a database of the computer system, past conversion data for the user;

inferring, from the online calendar, past calendar-based conversion data for the user;

generating tuning data including information about the past conversion data and the past calendar-based conversion data; and tuning the large language model using the tuning data.

3. The method of claim 1, further comprising:

generating, using the list of components, a second user interface signal;

sending, via the network, the second user interface signal to the device associated with the user, wherein sending the second user interface signal causes the device associated with the user to display the user interface with the list of components;

receiving, from the device associated with the user and via the network, a user signal including information about one or more modifications made to the list of components by the user via the user interface; and generating, further using the user signal, the list of items for conversion by the user.

4. The method of claim 1, wherein generating the list of items comprises:

generating a third prompt for input into the large language model, the third prompt including the second response, information about a source, and a request for generating a third response that includes the list of items for conversion by the user from the source; and requesting the large language model to generate, using the third prompt input into the large language model, the third response that includes the list of items for conversion by the user from the source.

5. The method of claim 1, further comprising:

generating, using the list of consumption activities, a second user interface signal;

sending, via the network, the second user interface signal to the device associated with the user, wherein sending the second user interface signal causes the device associated with the user to display the user interface with the list of consumption activities; and receiving, from the device associated with the user and via the network, a user signal including information about one or more modifications made to the list of consumption activities by the user via the user interface, wherein generating the second prompt comprises including in the second prompt the information about one or more modifications made to the list of consumption activities.

6. The method of claim 1, further comprising:

generating a third prompt for input into the large language model, the third prompt including the information about the online calendar, and a request for generating a third response that includes a volume of items converted by the user over a first time period;

requesting the large language model to generate, using the third prompt input into the large language model, the third response that includes the volume of items converted by the user over the first time period;

identifying, using the information about the online calendar and the volume of items, a portion of the volume of items for conversion by the user over a second time period following the first time period;

generating, using information about the portion of the volume of items, a second list of items for conversion by the user over the second time period;

generating, using the second list of items, a second user interface signal; and sending, via the network, the second user interface signal to the device associated with the user, wherein sending the second user interface signal causes the device associated with the user to display the user interface with the second list of items for conversion by the user.

7. The method of claim 6, wherein generating the second list of items comprises:

generating a fourth prompt for input into the large language model, the fourth prompt including the information about the portion of the volume of items, information about a source, and a request for generating a fourth response that includes the second list of items for conversion by the user from the source; and requesting the large language model to generate, using the fourth prompt input into the large language model, the fourth response that includes the second list of items for conversion by the user from the source.

8. The method of claim 1, further comprising:

identifying, using the information about the online calendar, that the user and one or more other people related to the user are at a delivery location of the user over a specific time period; and scheduling, by an artificial intelligence agent, an automatic delivery of at least a portion of the list of items to the delivery location for the specific time period by generating a signal that triggers the automatic delivery.

9. The method of claim 1, further comprising:

identifying, using the information about the online calendar, that the user and one or more other people related to the user are outside of a servicing area of the computer system over a specific time period; and pausing a delivery of at least a portion of the list of items to a delivery location of the user during the specific time period by generating a signal that triggers pausing of the delivery.

10. The method of claim 1, further comprising:

inferring, from the online calendar, the information about the online calendar including at least one of: information about activities of the user and one or more other people related to the user during the time period, past conversion data for the user and the one or more other people, information about preferences for the user and the one or more other people, information about one or more non-reoccurring events related to the user and the one or more other people, or a budget of the user for the time period.

11. The method of claim 1, further comprising:

inferring, from the online calendar, one or more changes made to the online calendar for a second time period following the time period;

generating a third prompt for input into the large language model, the third prompt including information about the one or more changes, the list of consumption activities, the list of components, and a request for generating a third response that includes a second list of items for conversion by the user over the second time period;

requesting the large language model to generate, using the third prompt input into the large language model, the third response that includes the second list of items;

generating, using the second list of items, a second user interface signal; and sending, via the network, the second user interface signal to the device associated with the user, wherein sending the second user interface signal causes the device associated with the user to display the user interface with the second list of items for conversion by the user.

12. The method of claim 1, further comprising:

automatically adding, by an artificial intelligence agent, the list of items to a cart of the user; and scheduling, by the artificial intelligence agent, an automatic delivery of the list of items to a delivery location of the user by generating a signal that triggers the automatic delivery.

13. A computer program product comprising a non-transitory computer readable storage medium having instructions encoded thereon that, when executed by a processor, cause the processor to perform steps comprising:

deploying, on a model serving system comprising super-computing infrastructure with enhanced computing capability, a large language model comprising a transformer neural network architecture, wherein the transformer neural network architecture comprises a set of decoders, each decoder performing an attention operation that generates keys, queries, and values from input data to generate an attention output, and wherein the large language model is configured to receive sequential data tokenized into a sequence of input tokens and to generate a sequence of output tokens;

exporting, from a device associated with a user of a computer system, an online calendar related to the user in a file format;

parsing, by a receiver module of the computer system, the exported online calendar in the file format to generate parsed calendar data including a list of events in the online calendar and metadata for the list of events;

passing the parsed calendar data from the receiver module to a prompt generation module of the computer system;

receiving, from the device associated with the user and via a network, a request to generate a list of items for conversion based on the online calendar;

responsive to receiving the request, generating, by the prompt generation module, a first prompt for input into the large language model, the first prompt including the parsed calendar data, information about the user, and a request for generating a first response that includes a list of consumption activities over a time period;

requesting the large language model to generate, using the first prompt tokenized into the sequence of input tokens and processed by the attention operation of the transformer neural network architecture, the first response that includes the list of consumption activities as a sequence of output tokens;

importing the first response from the model serving system to the computer system;

generating, by the prompt generation module, a second prompt for input into the large language model, the second prompt including the first response, information about a location of the user, a time required to prepare one or more consumption activities from the list of consumption activities, and a request for generating a second response that includes a list of components related to the list of consumption activities;

requesting the large language model to generate, using the second prompt tokenized into the sequence of input tokens and processed by the attention operation of the transformer neural network architecture, the second response that includes the list of components as a sequence of output tokens;

generating, using the second response that includes the list of components, the list of items for conversion by the user;

generating, using the list of items, a first user interface signal; and sending, via the network, the first user interface signal to the device associated with the user, wherein sending the first user interface signal causes the device associated with the user to display a user interface with the list of items for conversion by the user.

14. The computer program product of claim 13, wherein the instructions further cause the processor to perform steps comprising:

retrieving, from a database of the computer system, past conversion data for the user;

inferring, from the online calendar, past calendar-based conversion data for the user;

generating tuning data including information about the past conversion data and the past calendar-based conversion data; and tuning the large language model using the tuning data.

15. The computer program product of claim 13, wherein the instructions further cause the processor to perform steps comprising:

generating, using the list of components, a second user interface signal;

sending, via the network, the second user interface signal to the device associated with the user, wherein sending the second user interface signal causes the device associated with the user to display the user interface with the list of components;

receiving, from the device associated with the user and via the network, a user signal including information about one or more modifications made to the list of components by the user via the user interface; and generating, further using the user signal, the list of items for conversion by the user.

16. The computer program product of claim 13, wherein the instructions further cause the processor to perform steps comprising:

generating a third prompt for input into the large language model, the third prompt including the second response, information about a source, and a request for generating a third response that includes the list of items for conversion by the user from the source; and requesting the large language model to generate, using the third prompt input into the large language model, the third response that includes the list of items for conversion by the user from the source.

17. The computer program product of claim 13, wherein the instructions further cause the processor to perform steps comprising:

generating a third prompt for input into the large language model, the third prompt including the information about the online calendar, and a request for generating a third response that includes a volume of items converted by the user over a first time period;

requesting the large language model to generate, using the third prompt input into the large language model, the third response that includes the volume of items converted by the user over the first time period;

identifying, using the information about the online calendar and the volume of items, a portion of the volume of items for conversion by the user over a second time period following the first time period;

generating, using information about the portion of the volume of items, a second list of items for conversion by the user over the second time period;

generating, using the second list of items, a second user interface signal; and sending, via the network, the second user interface signal to the device associated with the user, wherein sending the second user interface signal causes the device associated with the user to display the user interface with the second list of items for conversion by the user.

18. The computer program product of claim 13, wherein the instructions further cause the processor to perform steps comprising:

identifying, using the information about the online calendar, that the user and one or more other people related to the user are at a delivery location of the user over a specific time period; and scheduling an automatic delivery of at least a portion of the list of items to the delivery location for the specific time period by generating a signal that triggers the automatic delivery.

19. The computer program product of claim 13, wherein the instructions further cause the processor to perform steps comprising:

inferring, from the online calendar, one or more changes made to the online calendar for a second time period following the time period;

generating a third prompt for input into the large language model, the third prompt including information about the one or more changes, the list of consumption activities, the list of components, and a request for generating a third response that includes a second list of items for conversion by the user over the second time period;

requesting the large language model to generate, using the third prompt input into the large language model, the third response that includes the second list of items;

generating, using the second list of items, a second user interface signal; and sending, via the network, the second user interface signal to the device associated with the user, wherein sending the second user interface signal causes the device associated with the user to display the user interface with the second list of items for conversion by the user.

20. A computer system comprising:

a processor; and a non-transitory computer-readable storage medium having instructions that, when executed by the processor, cause the computer system to perform steps comprising:

deploying, on a model serving system comprising supercomputing infrastructure with enhanced computing capability, a large language model comprising a transformer neural network architecture, wherein the transformer neural network architecture comprises a set of decoders, each decoder performing an attention operation that generates keys, queries, and values from input data to generate an attention output, and wherein the large language model is configured to receive sequential data tokenized into a sequence of input tokens and to generate a sequence of output tokens;

exporting, from a device associated with a user of the computer system, an online calendar related to the user in a file format;

parsing, by a receiver module of the computer system, the exported online calendar in the file format to generate parsed calendar data including a list of events in the online calendar and metadata for the list of events;

passing the parsed calendar data from the receiver module to a prompt generation module of the computer system;

receiving, from the device associated with the user and via a network, a request to generate a list of items for conversion based on the online calendar;

responsive to receiving the request, generating, by the prompt generation module, a first prompt for input into the large language model, the first prompt including the parsed calendar data, information about the user, and a request for generating a first response that includes a list of consumption activities over a time period;

requesting the large language model to generate, using the first prompt tokenized into the sequence of input tokens and processed by the attention operation of the transformer neural network architecture, the first response that includes the list of consumption activities as a sequence of output tokens;

importing the first response from the model serving system to the computer system;

generating, by the prompt generation module, a second prompt for input into the large language model, the second prompt including the first response, information about a location of the user, a time required to prepare one or more consumption activities from the list of consumption activities, and a request for generating a second response that includes a list of components related to the list of consumption activities;

requesting the large language model to generate, using the second prompt tokenized into the sequence of input tokens and processed by the attention operation of the transformer neural network architecture, the second response that includes the list of components as a sequence of output tokens;

generating, using the second response that includes the list of components, the list of items for conversion by the user;

generating, using the list of items, a first user interface signal; and sending, via the network, the first user interface signal to the device associated with the user, wherein sending the first user interface signal causes the device associated with the user to display a user interface with the list of items for conversion by the user.

* * * * *